US009983597B2

(12) United States Patent
Hertel

(10) Patent No.: US 9,983,597 B2
(45) Date of Patent: May 29, 2018

(54) VOLUMETRIC METERING UNIT

(71) Applicant: Zeppelin Systems GmbH, Friedrichshafen (DE)

(72) Inventor: Stefan Hertel, Immenstaad (DE)

(73) Assignee: ZEPPELIN SYSTEMS GMBH, Friedrichshafen (DE)

( * ) Notice: Subject to any disclaimer, the term of this patent is extended or adjusted under 35 U.S.C. 154(b) by 0 days. days.

(21) Appl. No.: 15/222,159

(22) Filed: Jul. 28, 2016

(65) Prior Publication Data
US 2016/0333868 A1 Nov. 17, 2016

Related U.S. Application Data

(62) Division of application No. 14/529,304, filed on Oct. 31, 2014, now Pat. No. 9,594,382.

(30) Foreign Application Priority Data

Oct. 31, 2013 (DE) ........................ 10 2013 018 281

(51) Int. Cl.
*B65D 88/54* (2006.01)
*G01F 11/00* (2006.01)
(Continued)

(52) U.S. Cl.
CPC .............. *G05D 9/00* (2013.01); *F04B 13/00* (2013.01); *F04B 13/02* (2013.01); *F04B 49/03* (2013.01);
(Continued)

(58) Field of Classification Search
CPC ......... Y10T 137/0318; Y10T 137/0396; Y10T 13/2673; G05D 9/00; F04B 13/00; F04B 13/02; F04B 49/03
(Continued)

(56) References Cited

U.S. PATENT DOCUMENTS 3,912,234 A * 10/1975 Peter ..................... B29B 7/7404
366/262
4,090,695 A * 5/1978 Stone .................... B29B 7/7626
222/63
(Continued)

FOREIGN PATENT DOCUMENTS

DE 102011122268 * 3/2013 .......... B01F 15/0462
DE 102011122268 B3 3/2013

OTHER PUBLICATIONS

Machine Translation of DE 102011122268 from www.wipo.int.*

Primary Examiner — Patrick M Buechner
Assistant Examiner — Jeremy W Carroll
(74) Attorney, Agent, or Firm — Browdy and Neimark, PLLC

(57) ABSTRACT

Method and device for metering a medium from at least one storage tank by a metering device, which has a piston pump, which defines a working chamber with a cylinder and a piston, wherein in a first method step a determined filling quantity of a medium is conveyed via an inlet valve into the working chamber and the determined filling quantity is greater than the quantity to be metered and, in a second method step, the piston reduces the working chamber in size enough that only the quantity to be metered remains, wherein the excess medium flows out of the working chamber, wherein the excess medium flows via the inlet valve back into a ring line, which is connected in a medium-conducting manner to the storage tank and is arranged outside the working chamber.

13 Claims, 2 Drawing Sheets

(51) Int. Cl.
  *G05D 9/00* (2006.01)
  *F04B 13/00* (2006.01)
  *F04B 49/03* (2006.01)
  *F04B 13/02* (2006.01)
  *F04B 49/035* (2006.01)
(52) U.S. Cl.
  CPC ....... *F04B 49/035* (2013.01); *Y10T 137/0318* (2015.04); *Y10T 137/0396* (2015.04); *Y10T 137/2673* (2015.04)
(58) Field of Classification Search
  USPC ........................................................ 222/318
  See application file for complete search history.

(56) References Cited

U.S. PATENT DOCUMENTS

| | | | | |
|---|---|---|---|---|
| 5,069,291 | A * | 12/1991 | O'Connell | A62C 35/00 137/68.11 |
| 5,238,147 | A * | 8/1993 | Yasui | B29C 45/1808 222/1 |
| 2004/0115067 | A1* | 6/2004 | Rush | A61M 5/14216 417/322 |
| 2009/0026220 | A1* | 1/2009 | Ramnarine | F04B 9/125 222/1 |
| 2015/0048109 | A1* | 2/2015 | Wang | D06F 39/02 68/12.19 |

* cited by examiner

VOLUMETRIC METERING UNIT

FIELD

The invention relates to a method and a device for metering a medium by a piston pump.

BACKGROUND

A metering device having a piston pump is already known from the prior art. Thus, for example, patent specification DE 42 06 576 B4 discloses a method and an arrangement for determining the conveyance quantity or the conveyance stream by a piston pump. The conveyance quantity may then be determined on the basis of the stroke number or the stroke frequency, and also the conveyance volume of the individual pressure strokes.

A method and a device for metering a liquid medium are disclosed by document DE 10 2011 122 268 B3. The appendix discloses a metering device in the form of a piston pump having a cylinder and a displaceable piston. In the disclosed embodiment, the medium flows into the cylinder chamber via an inlet line and the excess medium flows out of the cylinder chamber via a separate outlet line in the piston base. The metered volume flows out of the piston pump via an additional outlet line in the cylinder base. This embodiment represents a very complex design, because at least one inlet line and two outlet lines are required for this purpose.

The arrangement of valves in the piston base is also very complex, since the discharge lines must be implemented as movable hoses, to follow the movements of the piston.

A further disadvantage in this embodiment is that a medium only flows through the inlet line when it is introduced into the cylinder chamber. A standing medium is thus always present in the inlet line, which cools down in this time, for example. A chemical change of the medium can also occur during longer standing times in the inlet line.

A further disadvantage is that the inlet line is very cumbersome to clean or flush, since each flushing operation must be performed through the cylinder chamber. The inlet valve is also situated far away from the cylinder chamber. A certain amount of residual liquid therefore always remain in the last section, which is then possibly flushed into the cylinder chamber.

SUMMARY

The invention is therefore based on the object of enabling simpler and better volumetric metering using a piston device.

For the achievement of the stated object, according to one embodiment, a method for metering a medium from at least one storage tank by means of a metering device, which has a piston pump, which defines a working chamber with a cylinder and a piston, including the steps of conveying a determined filling quantity of a medium via an inlet valve into the working chamber and the determined filling quantity is greater than the quantity to be metered and, reducing, via the piston, the working chamber in size until only the quantity to be metered remains. The excess medium flows out of the working chamber and the excess medium flows via the inlet valve back into a ring line, which is connected in a medium conducting manner to the storage tank and is arranged outside the working chamber.

One feature of the invention is that the metering device has at least one inlet line and at least one outlet line in the cylinder base, wherein the inlet line is implemented as a ring line.

For this purpose, the excess medium flows back via the inlet valves into a ring line arranged outside the working chamber, which is connected in a medium-conducting manner to the storage tank.

The inlet line is preferably implemented so that the inlet line is implemented as a ring line, from which at least one tap line branches, which is connected to the inlet valve of the cylinder.

This is an advantage in relation to the prior art, which uses long flow paths subject to dead space, which are now minimized according to the invention by the arrangement of a ring line arranged outside the working chamber of the cylinder.

A further advantage is therefore that because of the implementation of the inlet line as a ring line, only one single conveyor pump is required, which conveys the required medium into the cylinder chamber. In contrast, the prior art requires two conveyor pumps.

In the event of a possible excess of the medium in the cylinder chamber, the piston or the piston pump can pump the excess medium back into the ring line against the pressure of the conveyor pump.

A further advantage of the present invention is that only two sensors are still necessary, which monitor the medium to be introduced into the cylinder chamber. A temperature sensor is thus preferably arranged in the ring line, while the general pressure sensor is located in the cylinder base of the piston pump.

Due to the arrangement of the sensor in the cylinder base of the piston pump, it is now possible for the first time that the sensor can monitor both the pressures of the inlet line and also the pressures of the outlet line. Thus, pressure monitoring takes place during the filling of the cylinder chamber, during the taring operation, and also during the volumetric determination.

This causes a minimization of the measurement tolerances, since only one pressure sensor is used. A compensation of different measured values which are produced by different sensors is avoided in the present invention.

A further advantage is that the pressure sensor in the cylinder base is a perfect arrangement for the volumetric metering device, because then the pressure can be directly measured inside the cylinder chamber, which the prior art does not provide, because therein every medium has a separate pressure sensor in the supply channel.

A further advantage in the present invention is that, originating from the ring line, only a short tap line conveys the medium to be conveyed into the cylinder chamber. This has substantial advantages, since the medium to be conveyed is continuously in motion in the ring line and therefore continuous monitoring of the medium with regard to temperature and pressure can take place.

Due to the short tap line to the cylinder chamber, the standing component of the medium within the line is greatly reduced. The prior art has provided long inlet lines, in contrast, in which the medium partially stands without a movement over longer periods of time.

A further advantage in the embodiment according to the invention is that it is independent of the set-up situation of the storage container. Thus, for example, the storage container can be arranged in another space or in another hall, while the medium is conveyed via the ring line relatively close to the metering unit and is only supplied in the last section via a short tap line to the cylinder. Continuous monitoring of the temperature and therefore uniform quality are always ensured by this embodiment.

In a further embodiment, the ring line has a bypass, which relieves the conveyor pump in the ring line in particular and thus, inter alia, ensures a uniform temperature of the flowing medium. The advantage thus exists that the pump in the ring line is continuously in operation and therefore the pressure and the temperature can be controlled well by way of a throttle in the bypass.

The pump in the ring line preferably conveys at a lower pressure than the piston pump in the cylinder, so that if excess medium is present inside the cylinder chamber, it can be pumped back into the ring line against the pressure of the conveyor pump.

The advantage of the present invention is that the number of sensors is reduced to a minimum and the medium is always available in the ring line. This is an advantage over the prior art, in which the medium is "standing" in the inlet lines over longer periods of time and a sensor has been necessary for each inlet line.

The inventive subject matter of the present invention not only results from the subject matter of the individual patent claims, but rather also from the combination of the individual patent claims with one another.

BRIEF DESCRIPTION OF THE DRAWINGS

The invention will be explained in greater detail hereafter on the basis of a drawing, which only illustrates one embodiment. Further features of the invention and advantages of the invention are disclosed in this case in the drawing and the description thereof.

In the figures.

DETAILED DESCRIPTION

Figure 1:
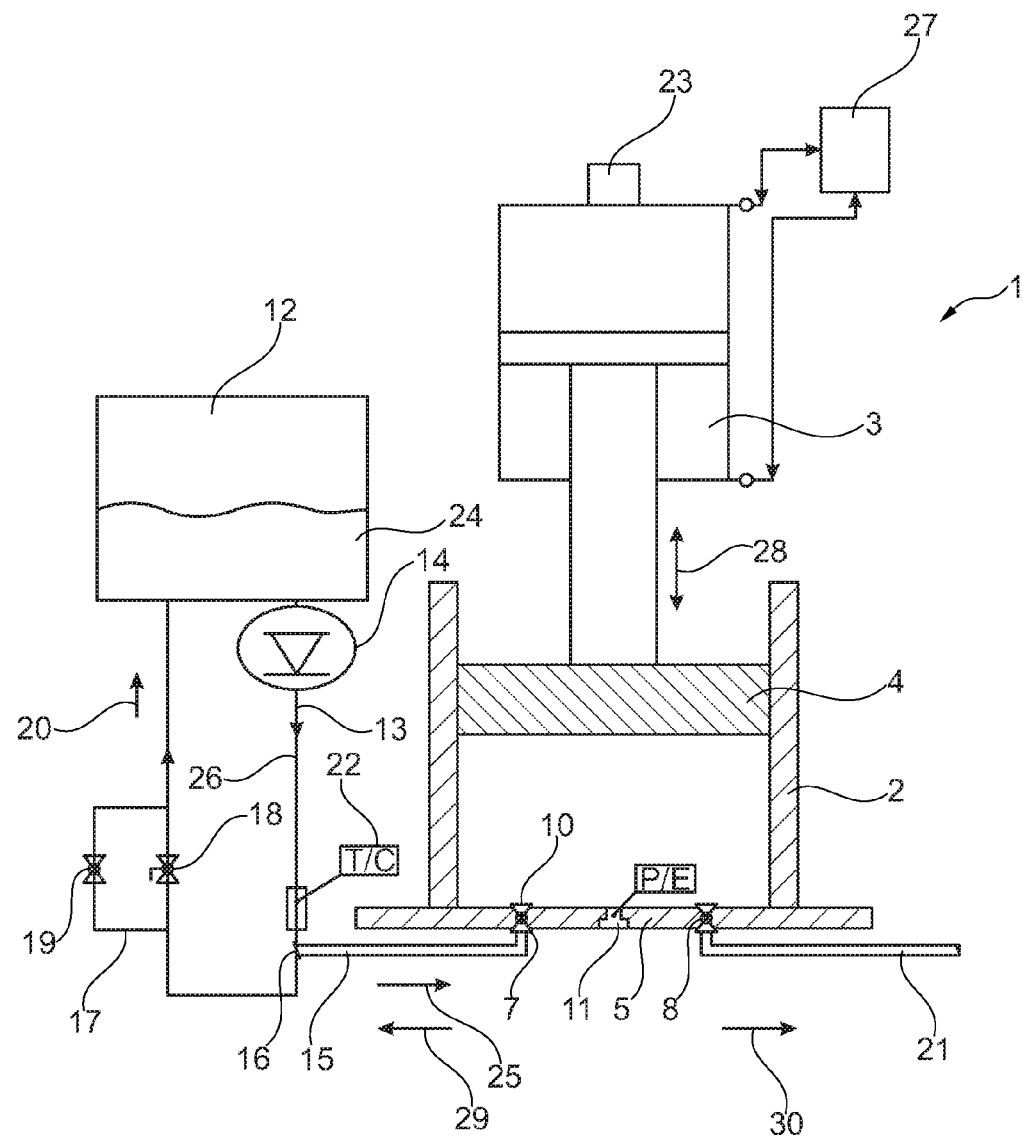
FIG. 1 shows a schematic illustration of the metering device according to one embodiment of the invention.

FIG. 1 shows the metering device 1 according to the invention. The metering device 1 consists of a piston pump 3, which has a cylinder 2 and a piston 4 arranged movably therein.

The cylinder 2 has a cylinder base 5, in which preferably at least one inlet valve 7 and at least one outlet valve 8 are arranged. The piston 4 defines, together with the cylinder 2, a working chamber 6 (see FIG. 2), in which the medium to be metered is volumetrically determined. The displacement of the piston 4 can be registered with the aid of a linear displacement sensor 23, whereby the current position of the piston 4 within the cylinder 2 is detectable.

In one advantageous embodiment, the entire metering device 1 can be kept at a uniform temperature using heating sleeves, so that demanding media can also be conveyed or metered.

In a first advantageous embodiment, the metering device 1 has at least one storage tank 12, which preferably contains a first medium 24.

The storage tank 12 can be implemented as climate-controlled, which relates in particular to a heater in the present embodiment, which keeps the medium 24 at a constant temperature.

In the present invention, the volume of the medium inside the metering device is determined via the density, the temperature, and the movement displacement of the piston. The gas volume contained in the medium can optionally be ascertained on the basis of the compressibility.

With regard to the medium 24, the present invention encompasses all liquid or gaseous or solid (free-flowing) media which can be conveyed using a metering device.

In a further preferred embodiment, the storage tank 12 can have a stirring mechanism (not shown), using which the medium 24 to be conveyed is continuously stirred and therefore no "hot spots" arise.

The present invention is not restricted to one storage tank 12 and one medium 24, but rather multiple media can also be volumetrically determined using the metering device 1, which are subsequently supplied to a mixer, for example. This therefore preferably relates to a multi-material metering device.

In the first preferred embodiment, a ring line 13 having a conveyor pump 14 is arranged on the storage tank 12. The storage tank 12 has at least one outlet and at least one inlet, which are connected by the ring line 13. The medium 24 circulates inside the ring line 13 due to the conveyor pump 14.

The medium 24 leaves the storage tank 12 via an outlet and enters the ring line 13. If no medium 24 is discharged into the tap line 15, the medium 24 thus flows back again in the arrow direction 20 into the inlet of the same storage tank 12. The ring line 13 is therefore used as a medium-conducting connection between the outlet and the inlet of the storage tank 12.

The arrangement of a ring line 13 and the continuous operation of the conveyor pump 14 have the advantage that a constant quality of the medium is always available. Different temperature ranges are avoided within the line.

The ring line 13 preferably has a T-part 16, on which a tap line 15 is arranged. The tap line 15 is implemented as relatively short in relation to the ring line 13 and establishes a connection for the medium 24 between the ring line 13 and the cylinder 2 or cylinder base 5.

One advantage of the short tap line 15 is that temperature variations or temperature differences with regard to the medium 24 can be avoided. Because of the shorter length of the tap line 15, a uniform temperature is ensured up to the cylinder 2 or up into the working chamber 6.

The tap line 15 is preferably attached via a T-part 16 to the ring line 13. However, a controllable valve is also possible, by way of which a shutoff takes place between the ring line 13 and the tap line 15.

In one embodiment, the medium 24 is both introduced into the cylinder 2 or the working chamber 6 in the arrow direction 25, and also the excess medium is returned back in the arrow direction 29 in the opposite direction via the tap line 15. The excess medium has been ascertained in this case by the metering device 1 in the working chamber 6 and must be discharged at least once during the metering operation.

The arrangement of a ring line 13 together with a short tap line 15 has the substantial advantage that only one line 15 is still necessary, which supplies the medium 24 into the working chamber 6 and discharges it again.

The tap line 15 is thus used both as an inlet line into the working chamber 6 and also as an (outlet) excess line, which conveys the excess medium back into the ring line 13.

In a further embodiment, a valve 18 is arranged in the ring line 13, which is implemented as a throttle valve 18. The pressure inside the ring line 13 may be controlled and regulated by the adjustable throttle valve 18.

Using the throttle 18, relatively high pressures are achieved inside the ring line 13, which has the advantage that the medium 24 flows relatively rapidly via the tap line 15 into the cylinder chamber or working chamber 6, whereby the occurrence of cavitation is avoided, inter alia.

The ring line 13 preferably has a temperature sensor 22, which monitors the temperature of the medium 24. Due to the implementation of the inlet line as a ring line 13, only one temperature sensor 22 is necessary according to one embodiment to the invention, since no different temperature ranges are present in the metering device 1.

If excess medium is now established during the volumetric metering operation inside the cylinder 2 or the working chamber 6, pumping back of the excess medium via the inlet valve 7 into the ring line 13 thus takes place.

The pressure on the excess medium is produced in this case by the piston pump 3, wherein the piston 4 moves downward in a linear movement in the arrow direction 28. It is decisive that the pressure of the piston pump 3 is higher than the pressure which is generated by the pump 14 in the ring line 13. In the case of an open inlet valve 7, the excess medium can therefore be guided back out of the cylinder 2 into the ring line 13.

During the return of the excess medium 24 from the working chamber 6, a bypass 17 is opened on the ring line 13 via a valve 19, whereby the pressure within the ring line 13 drops. The piston pump 3 can therefore pump the excess medium 24 back into the ring line 13.

The entire metering operation is monitored by a sensor 11. The sensor 11 may be arranged in the cylinder base 5 of the cylinder 2 and continuously monitors the pressure inside the working chamber 6.

In a further embodiment, trace heating 26 is arranged on the ring line 13, which ensures a constant temperature control of the medium 24 inside the ring line 13.

The sequence of a possible volumetric metering operation is described hereafter:

1. The pump 14 conveys a medium 24 inside the ring line 13.
   The piston 4 is located at the height of the cylinder base 5, the working chamber 6 is empty.
   Opening of the inlet valve 7. The medium 24 flows into the working chamber 6 of the cylinder 2 via the tap line 15.
   The pressure sensor 11 monitors the pressure in the working chamber 6 during the entire operation and controls the upward movement of the piston 4 in the cylinder 2, so that vacuum does not arise in the working chamber 6.
2. Filling of the working chamber 6, until the filling quantity is greater than the quantity to be metered. The filling quantity is preferably approximately 10% greater than the quantity to be metered.
   The ascertainment of the filling quantity is preferably performed via a displacement sensor 23, which monitors the displacement of the piston 4.
   The displacement of the piston must therefore exceed the metered quantity by a specific percentage. The speed of the piston 3 is variable via the valve 27 and an extra control loop provided for this purpose.
3. If the desired filling quantity is reached, the inlet valve 7 closes and the piston 4 moves linearly downward, whereby the medium 24 inside the working chamber 6 is compressed and a continuous measurement of the compressibility takes place using the pressure sensor 11.
4. Establishing the compressibility and adding this value to the target metering volume.
5. Opening the bypass valve 19 inside the ring line 13 and subsequently opening the inlet valve 7 to discharge the excess medium from the working chamber 6.
6. Closing the inlet valve 7 upon reaching the desired volume.
7. Subsequently opening the outlet valve 8, whereby the desired volume flows via an outlet line 21 in the arrow direction 30 out of the working chamber 6.

According to the present embodiment, the excess medium is pressed via the same inlet valve 7 back out of the working chamber and is pumped back into the ring line 13.

Figure 2:
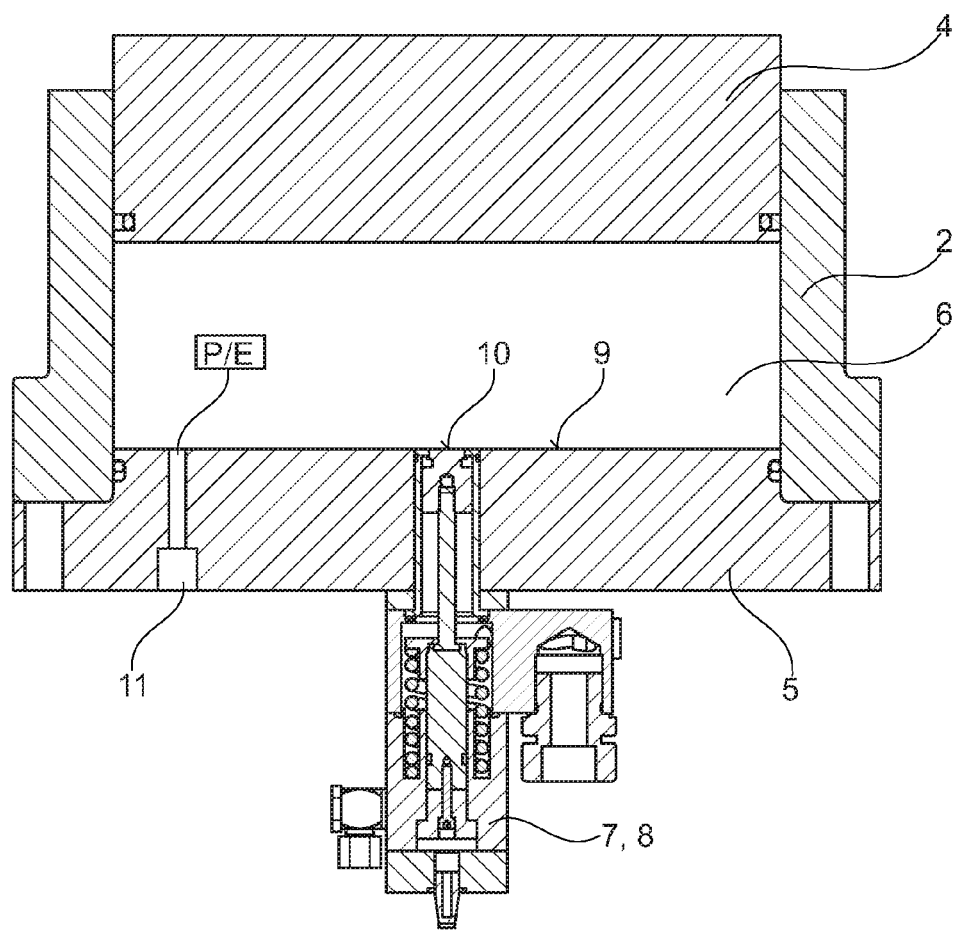
FIG. 2 shows a cylinder with the arrangement of a pressure sensor.

FIG. 2 shows an embodiment according to the invention of the cylinder 2 of the metering device.

In a first embodiment, a pressure sensor 11, which continuously measures the pressure of the working chamber 6, is arranged in the cylinder base 5.

The inlet valve 7 and/or the outlet valve 8 are arranged in the cylinder base 5 so that they are substantially flush with the cylinder base 9 on the working side. The valves 7 and/or 8 therefore form a sealing surface 10 with the working-side cylinder base 9.

One advantage upon the arrangement of an inlet and/or outlet valve 7, 8 inside the cylinder base 5 is that the contamination medium is reduced, which was not known in the previous prior art. The prior art has provided long supply or discharge lines, wherein the inlet or outlet valve, respectively has been arranged relatively far away from the cylinder base.

Due to the direct arrangement of the inlet and/or outlet valve 7, 8 in the cylinder base, in the advantageous embodiment, the dead space is reduced or eliminated. This is particularly important if multiple different media are to be introduced into the working chamber 6 or metered therein, which cannot be mixed with one another in any case.

Due to the arrangement relatively free of dead space, the metering device is suitable for numerous different media.

In a further preferred embodiment, the position of the inlet and/or outlet valve 7, 8 can be monitored electrically or electronically.

The inlet and/or outlet valve 7, 8 can also be implemented as hydraulic or also pneumatic or also electrical.

In one embodiment, both the valve 27 for the control of the cylinder 2, and also the inlet and outlet valves 7, 8 can be controlled via one hydraulic unit. However, the invention is not to be restricted thereto, it is also possible that each valve has a separate hydraulic unit or another power source.

LIST OF REFERENCE NUMERALS 1 metering device
2 cylinder
3 piston pump
4 piston base
5 cylinder base
6 working chamber
7 inlet valve
8 outlet valve
9 cylinder base (working chamber side)
10 cylinder surface of 9
11 sensor (pressure)
12 storage tank
13 ring line (inlet)
14 pump of ring line
15 tap line
16 T-part
17 bypass
18 valve (throttle)

19 valve bypass
20 arrow direction
21 outlet line (of 8)
22 temperature sensor
23 displacement sensor (linear)
24 medium
25 arrow direction
26 trace heating
27 valve
28 arrow direction
29 arrow direction
30 arrow direction outlet

The invention claimed is:

1. A device for metering at least one medium, comprising:
at least one storage tank for storing the at least one medium,
a sensor for monitoring the medium,
a piston pump connected to the sensor, comprising a cylinder, a movable piston, and a working chamber defined by the cylinder and the movable piston, wherein the working chamber has an inlet valve and an outlet valve, through which at least the medium flows into or out of the working chamber,
a single bidirectional tap line having a first end connected to the inlet valve and a second end,
an outlet line connected at one end to the outlet valve through which the medium in the working chamber can flow out of the working chamber,
a ring line arranged outside the working chamber of the cylinder and connected at each end to the at least one storage tank,
wherein the second end of the single bidirectional tap line is connected to the ring line at a position in an intermediate location along the ring line and the ring line is configured to transfer the at least one medium from the at least one storage tank to the working chamber through said inlet valve and to transfer excess volume of the at least one medium from the working chamber to the at least one storage tank responsive to the metering device, and
wherein excess medium is pressed via the inlet valve connected to the single bidirectional tap line back out of the working chamber into the single bidirectional tap line and is pumped back into the ring line.

2. The device according to claim 1, further comprising a conveyor pump, which conveys the at least one medium inside the ring line, is disposed on the ring line.

3. The device according to claim 1, further comprising a bypass comprising a valve connecting the bypass to the ring line through which the at least one medium is transferred to drop pressure of the excess volume of the at least one medium.

4. The device according to claim 1, wherein the cylinder has a cylinder base in which the sensor is disposed.

5. The device according to claim 1, wherein at least one of the at least one inlet valve and the at least one outlet valve are disposed in the cylinder base.

6. The device according to claim 1, wherein the ring line has trace heating.

7. The device according to claim 4, wherein the sensor is a pressure sensor.

8. The device according to claim 1, further comprising a temperature sensor disposed on the ring line to measure temperature of the at least one medium flowing through the ring line.

9. The device according to claim 1, wherein the single bidirectional tap line is used both as an inlet line into the working chamber and also as an outlet excess line, which conveys the excess medium back into the ring line.

10. The device according to claim 1, wherein the tap line is attached via a T-part to the ring line by way of which shutoff takes place between the ring line and the single bidirectional tap line.

11. The device according to claim 1, wherein the medium is both introduced into the cylinder or the working chamber and also the excess medium is returned back in the opposite direction via the single bidirectional tap line.

12. The device according to claim 1, wherein at least one of the inlet valve and the outlet valve is arranged in the cylinder so that the at least one of the inlet valve and the outlet valve is substantially flush with a base of the cylinder on the working side.

13. The device according to claim 12, wherein at least one of the inlet valve and outlet valve form a sealing surface with the working-side of the base of the cylinder.

\* \* \* \* \*